United States Patent
Weddle

(10) Patent No.: US 7,974,793 B2
(45) Date of Patent: Jul. 5, 2011

(54) SYSTEMS, AND/OR DEVICES TO CONTROL THE SYNCHRONIZATION OF DIAGNOSTIC CYCLES AND DATA CONVERSION FOR REDUNDANT I/O APPLICATIONS

(75) Inventor: Robert Alan Weddle, Watauga, TN (US)

(73) Assignee: Siemens Industry, Inc., Alpharetta, GA (US)

( * ) Notice: Subject to any disclaimer, the term of this patent is extended or adjusted under 35 U.S.C. 154(b) by 182 days.

(21) Appl. No.: 12/199,870

(22) Filed: Aug. 28, 2008

(65) Prior Publication Data

US 2009/0063739 A1    Mar. 5, 2009

Related U.S. Application Data

(60) Provisional application No. 60/996,967, filed on Aug. 31, 2007, provisional application No. 60/995,388, filed on Sep. 26, 2007.

(51) Int. Cl.
    *G01R 31/00* (2006.01)
(52) U.S. Cl. ............................. 702/58; 702/81; 702/122
(58) Field of Classification Search ................. 341/899; 702/58, 81, 122; 710/110, 200, 220, 240, 710/305; 711/156, 163; 712/31
See application file for complete search history.

(56) References Cited

U.S. PATENT DOCUMENTS

| | | | |
|---|---|---|---|
| 6,026,352 A | 2/2000 | Brown | |
| 6,141,736 A * | 10/2000 | Abert et al. | 711/156 |
| 6,262,901 B1 * | 7/2001 | Simopoulos | 363/72 |
| 6,640,264 B1 | 10/2003 | Moore | |
| 7,124,041 B1 | 10/2006 | Johnson | |
| 7,235,953 B2 | 6/2007 | Aoyama | |
| 7,268,719 B2 * | 9/2007 | Terazawa et al. | 341/157 |
| 7,539,548 B2 * | 5/2009 | Dhawan | 700/19 |
| 2002/0083364 A1 | 6/2002 | Christensen et al. | |
| 2002/0184410 A1 | 12/2002 | Apel et al. | |
| 2009/0096536 A1 * | 4/2009 | Ortler | 331/25 |

FOREIGN PATENT DOCUMENTS

| | | |
|---|---|---|
| EP | 0422507 A2 | 4/1991 |
| EP | 1710642 A2 | 10/2006 |
| EP | 1857938 A1 | 11/2007 |
| WO | WO2005/031562 | 4/2005 |
| WO | WO 2006080433 A1 | 8/2006 |

* cited by examiner

*Primary Examiner* — Michael P Nghiem
*Assistant Examiner* — Elias Desta
(74) *Attorney, Agent, or Firm* — Jose R. de la Rosa

(57) ABSTRACT

Methods and systems for controlling the synchronization of diagnostic cycles and data conversion for redundant I/O applications are provided. An exemplary system comprises a first analog input module adapted to request mastership with respect to a second analog input module, output a synchronization pulse to said second analog input module, initiate a diagnostic cycle of said second analog input module, and initiate a data conversion cycle, and wherein said second analog input module, said second analog input module are adapted to assume a slave role with respect to said first analog input module. Numerous other aspects are provided.

15 Claims, 6 Drawing Sheets

4100

US 7,974,793 B2

SYSTEMS, AND/OR DEVICES TO CONTROL THE SYNCHRONIZATION OF DIAGNOSTIC CYCLES AND DATA CONVERSION FOR REDUNDANT I/O APPLICATIONS

CROSS-REFERENCES TO RELATED APPLICATIONS

This application claims priority to, and incorporates by reference herein in its entirety, pending U.S. Provisional Patent Application Ser. No. 60/995,388, filed 26 Sep. 2007 and pending U.S. Provisional Patent Application Ser. No. 60/966,967, filed 31 Aug. 2007.

BACKGROUND

U.S. Pat. No. 7,124,041 (Johnson), which is incorporated by reference herein in its entirety, allegedly discloses that "[c]ertain exemplary embodiments can comprise a method for detecting a circuit fault, comprising: for a sensor coupleable to an input circuit, the sensor characterized by an output signal operating voltage range: automatically causing the sensor to be electrically disconnected from the input circuit; automatically causing an invalid sensor voltage to be applied to the input circuit, the invalid sensor voltage having a value outside the output signal operating voltage range for the sensor; automatically causing the invalid sensor voltage to be removed from the input circuit; automatically causing the sensor to be electrically connected to the input circuit; and, in the event that an input circuit voltage value is outside the output signal operating voltage range for the sensor, automatically providing notification that a circuit fault is associated with the sensor." See Abstract.

U.S. Pat. No. 6,640,264 (Moore), which is incorporated by reference herein in its entirety, allegedly discloses that "[a] programmable logic controller (PLC) having a process means, a sampling means, and a diagnostic means, to invoke discrete incremental states representing an infinite number non discrete intermediate input values from electromechanical sensors such as rheostats, resistive pressure gauges, resistive thermal sensors, or the like, within logic based program control sequences. A methodology to employ an infinite number of non discrete intermediate values of voltage, current, or resistance, represented by user-defined incremental states for invoking logic based control sequences to operate electromechanical devices such as solenoids, relays, indicating lamps, or the like. A system comprised of an apparatus and methodology in a singular or plurality of devices provides an operational means to observe, filter, and control, various electrical characteristics for electromechanical devices." See Abstract.

SUMMARY

Certain exemplary embodiments can provide a first analog input module adapted to, via a sent synchronization signal, automatically terminate a diagnostic cycle of a second analog input module. The synchronization signal can be adapted to cause an initiation of a data conversion cycle at the second analog input module.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a first analog input module adapted to, via a sent synchronization signal, automatically terminate a diagnostic cycle of a second analog input module. The synchronization signal can be adapted to cause an initiation of a data conversion cycle at the second analog input module.

The process control industry, via, for example, programmable logic controller (PLC) systems, sometimes adapts systems to measure inputs redundantly so that if one input should fail, the other can still read a valid input. Connecting analog input modules to the same sensor such as a thermocouple is a common practice to guarantee the proper input reading. However, analog inputs with wire-break detection capability can cause errors in the second analog inputs reading while the wire-break detection is in progress. Synchronization of the diagnostic cycle and the data conversion can eliminate this error.

In certain applications, analog inputs with active wire-break detection cannot be used in a redundant application unless the wire-break detection circuit is disabled. External passive circuits have been used to provide wire-break detection at the expense of input accuracy.

By providing a synchronization pulse or message between the two analog input modules, the diagnostic cycle and data conversion can be synchronized so that the wire-break detection circuit is enabled only during a predefined time and is turned off during the data conversion time.

In certain exemplary embodiments, a synchronization pulse can be used to trigger the start of the process or can be used to frame the event times of the diagnostic cycle and the data conversion cycle. In certain exemplary embodiments, a message transfer to/from each module can be used in systems where the master/slave relationship can be defined and/or controlled.

When the input processing cycle is well defined and sufficient time is provided between the diagnostic cycle (wire-break detection) and the data conversion, a simple synchronization pulse can be used to start the input processing cycle. The master module can run normally with an internal timer to control the input process and output a synchronization pulse to trigger the slave module to start the input process.

Figure 1:
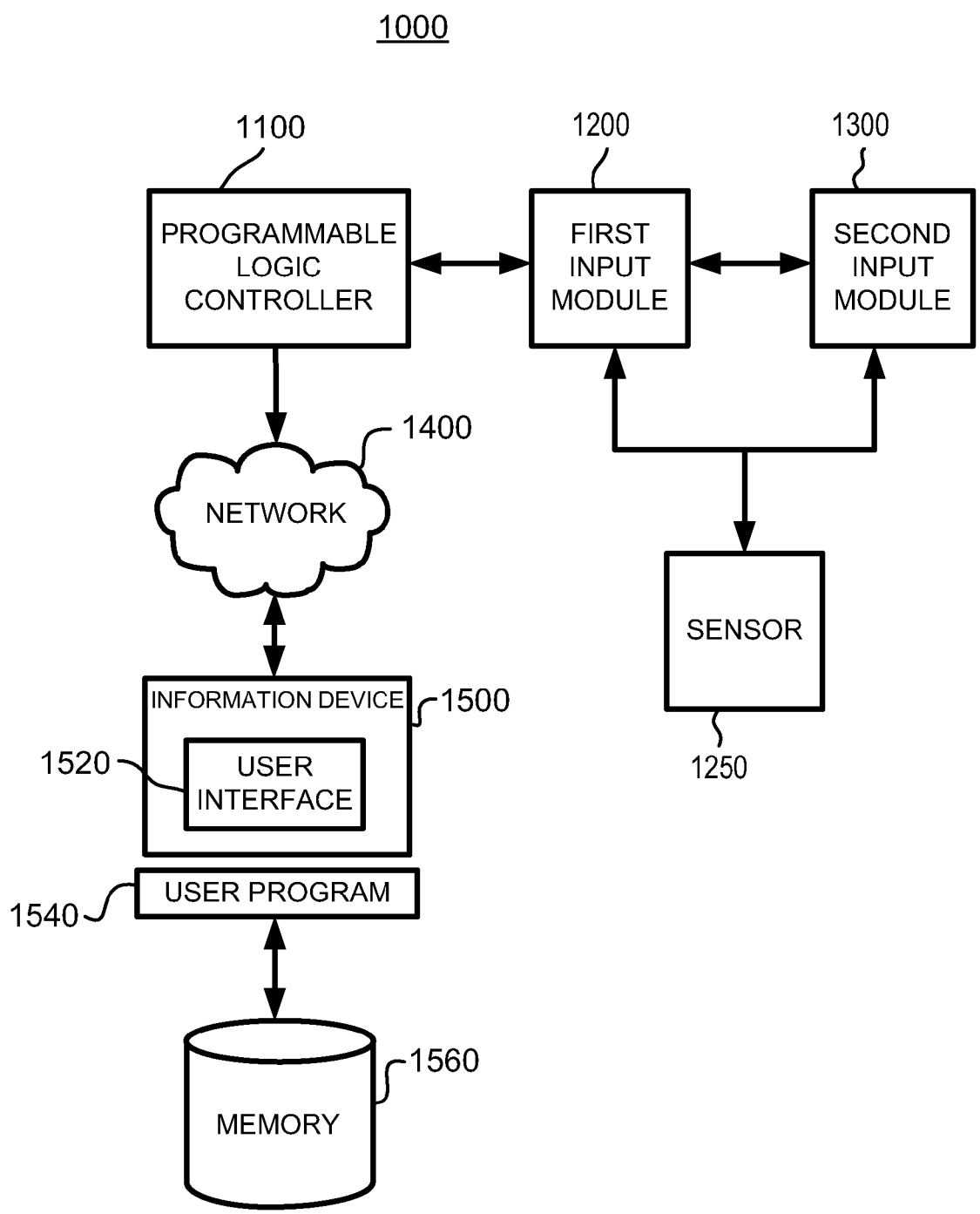
FIG. 1 is a block diagram of an exemplary embodiment of a system 1000.

FIG. 1 is a block diagram of an exemplary embodiment of a system 1000, which can comprise a programmable logic controller 1100. In certain exemplary embodiments, programmable logic controller 1100 can comprise and/or be communicatively coupled to a first input module 1200 and a second input module 1300. Each of first input module 1200 and second input module 1300 can be analog input modules. In certain exemplary embodiments, first input module 1200 and second input module 1200 can be communicatively coupled to a sensor 1250, such as a thermocouple. In certain exemplary embodiments, each of first input module 1200 and second input module 1200 can be communicatively coupled to a separate sensor to provide additional fault tolerance in system 1000. In certain exemplary embodiments, system 1000 can be adapted to define a master/slave relationship between first input module 1200 and second input module 1300.

In certain exemplary embodiments, first input module 1200 can be adapted to:
- send to second analog input module 1300 a request to establish communication with second analog input module 1300;
- receive from second analog input module 1300 an acknowledgment of a request to establish communication between first analog input module 1200 and second analog input module 1300;
- establish communication with second analog input module 1300;
- define a master/slave relationship with respect to second analog input module 1300;
- request mastership with respect to second analog input module 1300;
- assume mastership with respect to second analog input module 1300;
- output a synchronization pulse to second analog input module 1300;
- initiate a diagnostic cycle, which can be adapted to automatically detect a broken wire; and/or
- initiate a data conversion cycle, which can be adapted to automatically obtain a temperature value from a thermocouple.

Second analog input module 1300 can be adapted to:
- assume a slave role with respect to first analog input module 1200;
- if initiation of the diagnostic cycle does not occur within a predetermined time, assume mastership with respect to first analog input module 1200;
- upon completion of the diagnostic cycle, send acknowledgment that the diagnostic cycle is complete;
- upon completion of the data conversion, send acknowledgment that that data conversion is complete; and/or
- if initiation of the data conversion cycle does not occur within a predetermined time, assume mastership with respect to first analog input module 1200.

In certain exemplary embodiments, first analog input module 1200 can be adapted to, via a sent synchronization signal, automatically terminate a diagnostic cycle of second analog input module 1300. The synchronization signal can be adapted to cause an initiation of a data conversion cycle at second analog input module 1300. The synchronization signal can be sent subsequent to an acknowledged request to establish communication with second analog input module 1300.

Programmable logic controller 1100 can be communicatively coupled to an information device 1500 via a network 1400. Information device 1500 can comprise and/or be communicatively coupled to a user interface 1520, a user program 1540, and a memory 1560. User program 1540 can be adapted to monitor and/or control one or more activities associated with programmable logic controller 1100 such as information transfers between programmable logic controller 1100 and/or first input module 1200 and/or second input module 1200. User interface 1520 can be adapted to render information regarding programmable logic controller 1100 such as information transfers between programmable logic controller 1100 and/or first input module 1200 and/or second input module 1200. Memory 1560 can be adapted to store and/or retrieve information regarding programmable logic controller 1100.

Figure 2:
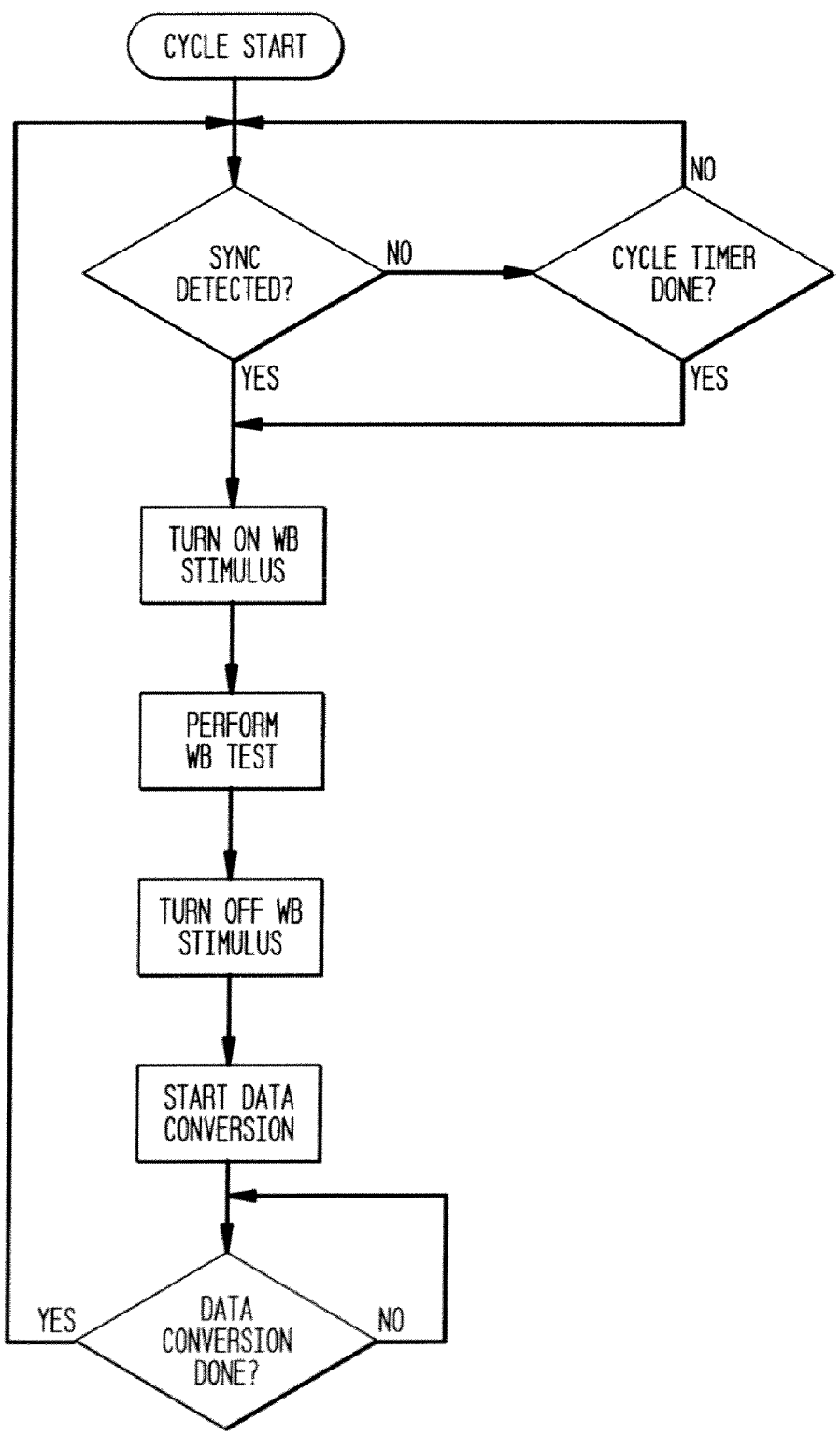
FIG. 2 is a flowchart of an exemplary embodiment of a method 2000.

FIG. 2 is a flowchart of an exemplary embodiment of a method 2000. The master/slave relationship can be predefined and might not be swapped due to a loss of the master module. In certain exemplary embodiments, if the slave module does not detect the synchronization pulse, the slave can continue to run on internal timers until a new synchronization pulse is detected from the master module.

Figure 3:
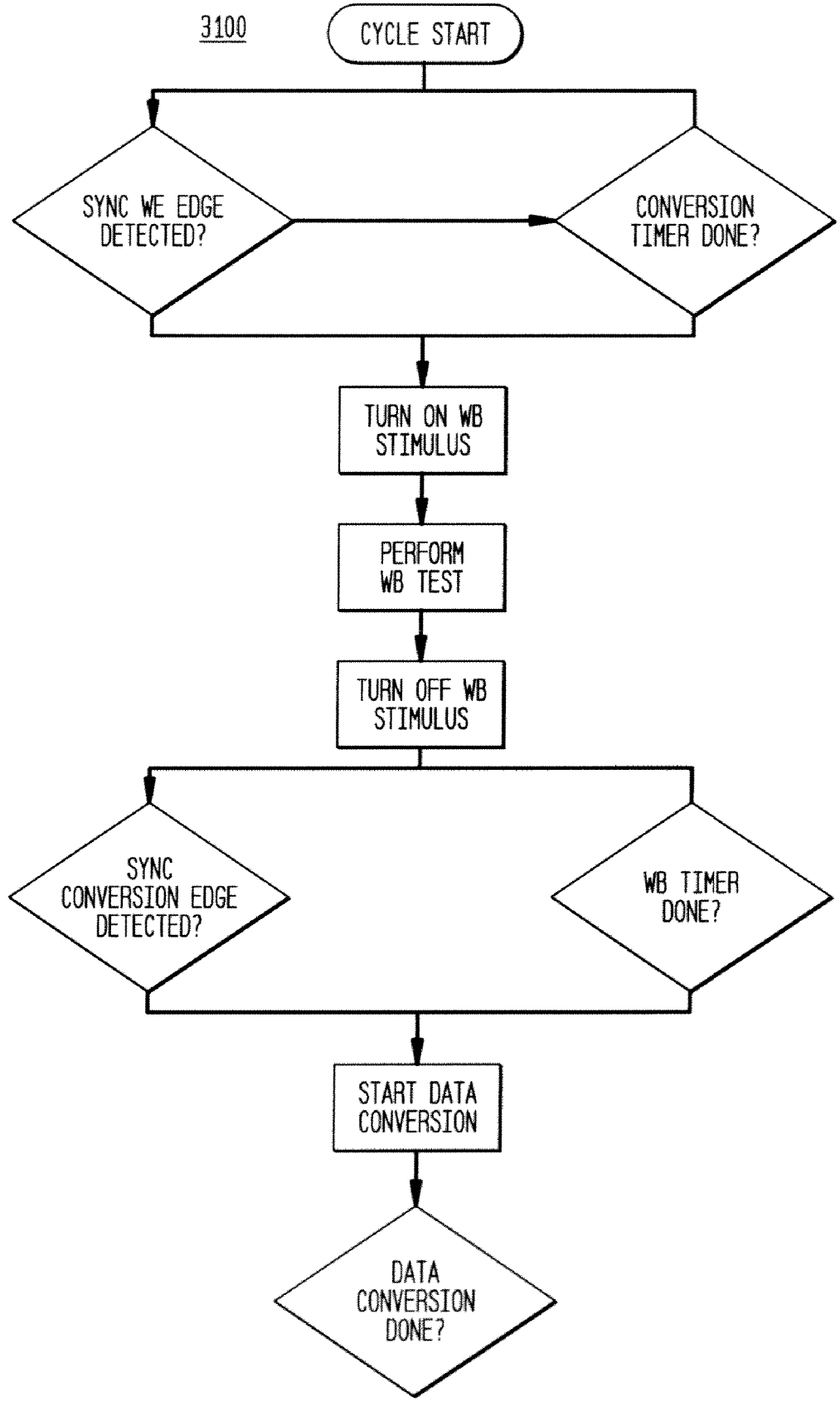
FIG. 3 is a flowchart of an exemplary embodiment of a method 3000.

FIG. 3 is a flowchart of an exemplary embodiment of a method 3000. When the input processing cycle is not well defined, the synchronization pulse can be used as a framing signal to determine when the diagnostic cycle is to run and when the data conversion cycle is to run. For example, when the synchronization pulse is high, the diagnostic cycle can be enabled and when the synchronization pulse transitions low, the diagnostic cycle can be disabled and data conversion can begin. Once again, the master/slave relationship can be predefined in this solution and might not be swapped due to a loss of the master module. If the slave module does not detect the framing synchronization pulse, the slave module can continue to run on internal timers until a new synchronization pulse is detected from the master module.

Figure 4:
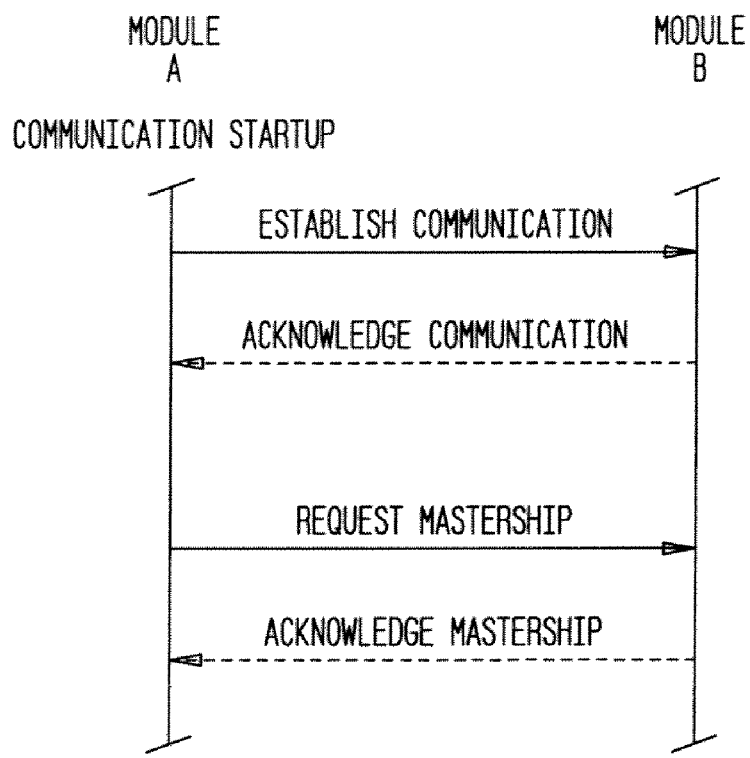
FIG. 4 is a signal diagram of an exemplary embodiment of a method 4000.
Figure 4:
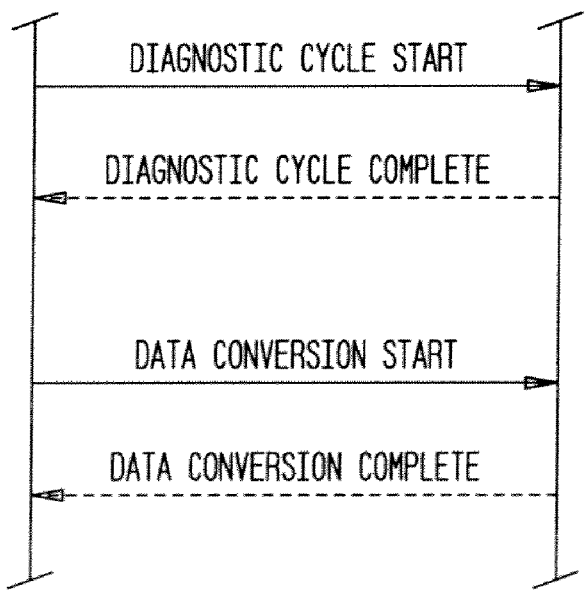

FIG. 4 is a signal diagram of an exemplary embodiment of a method 4000. In certain exemplary embodiments, the master/slave relationship can be controlled and/or swappable. A message transfer solution can be used to determine the master/slave relationship and/or control the diagnostic cycle and data conversion times. Communication can first be established at power-up. Module A can send a request to establish communication. If Module B is present, it can acknowledge this request. Upon receiving the acknowledgement from Module B that communication is established, Module A can request mastership and/or assume the role of master. Module B can acknowledge the request for mastership and assume the role of slave. If Module B is not present during the request to establish communication, Module A can assume mastership and continue to request to establish communication. After the mastership role is determined, the module cycle can be synchronized. Module A can send the start diagnostic cycle command. Upon completion of the diagnostic cycle, Module B can send the acknowledgement that the diagnostic cycle is complete. Module A can then send the start data conversion command. Again, upon completion of the data conversion cycle, Module B can send the acknowledgement that the data conversion cycle is complete. Module A can then repeat the process by sending the diagnostic cycle start again. If at any point Module A should be lost/removed, Module B might not receive the start command for a given cycle. An internal timer can timeout indicating to Module B that synchronization is lost and Module B can take over the mastership role and attempt to establish communication which Module A. When Module A can be reactivated or reinserted, it can acknowledge the request to establish communication and assume the role of slave.

The physical connection between the two modules can be a single ended signal or a differential signal for increased noise immunity. Any available port pin can be used to send or receive the synchronization pulse. Similarly, any available serial communication port can be used as the transfer mechanism for the message transfer solution.

Figure 5:
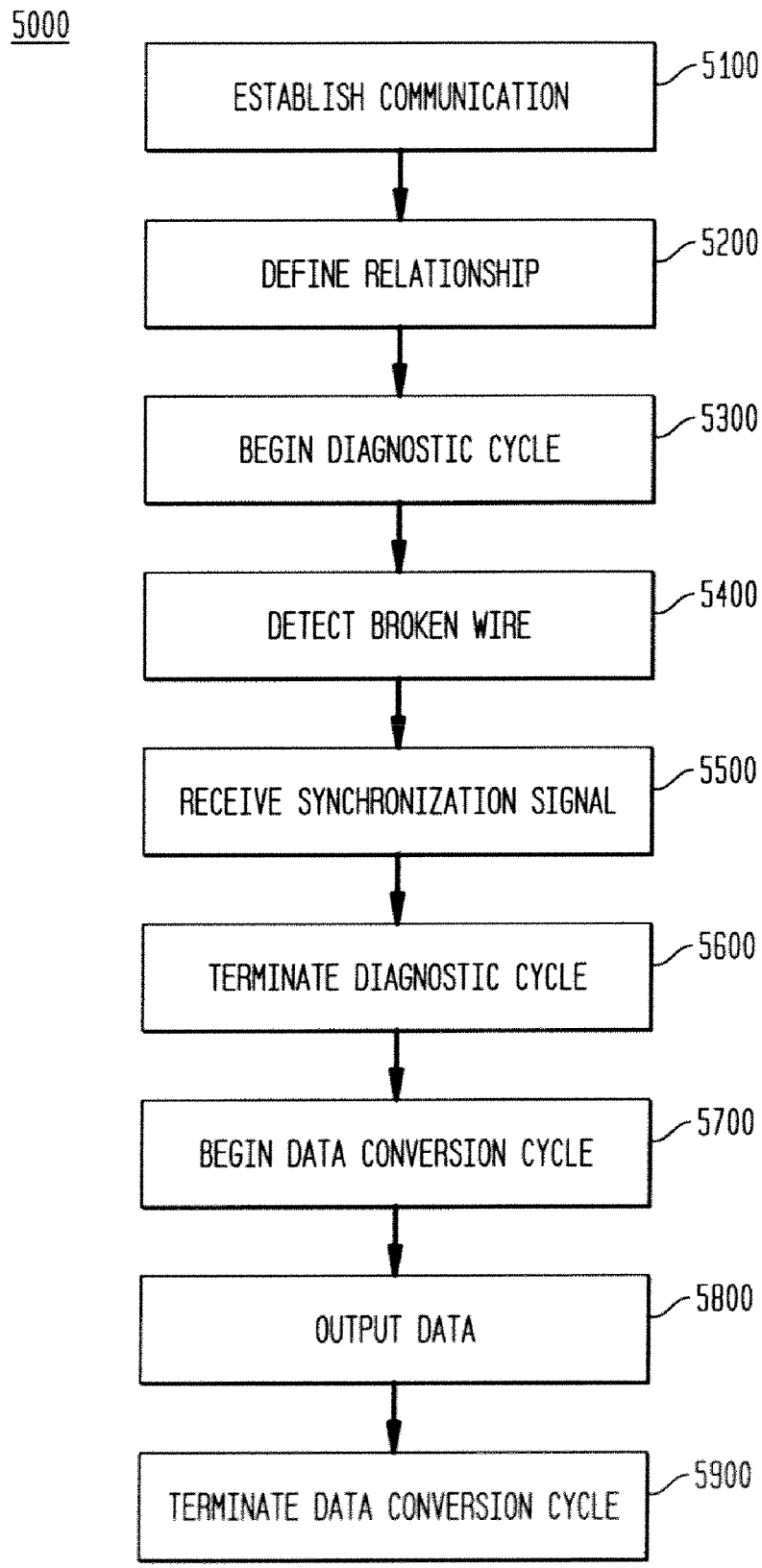
FIG. 5 is a flowchart of an exemplary embodiment of a method 5000.

FIG. 5 is a flowchart of an exemplary embodiment of a method 5000. In certain exemplary embodiments, one or more activities of method 5000 can be performed automatically, such as via machine-implementable instructions stored on a machine-readable medium. At activity 5100, communication can be established between a first module and a second module of a programmable logic controller and/or a programmable logic controller system. The first module and/or the second module can be analog input modules. The first module can be adapted to send to the second module a request to establish communication with the second module. The first module can be adapted to receive from the second module an acknowledgment of a request to establish communication between the first module and the second module.

At activity 5200, a relationship between the first module and the second module can be defined. Certain exemplary embodiments can define a master/slave relationship with respect to the second module. Certain exemplary embodiments can define a master/slave relationship between the first module and the second module. The first module can request and/or assume mastership with respect to the second module. The second module adapted to assume a slave role with respect to the first module.

At activity 5300, the second module can begin a diagnostic cycle. In certain exemplary embodiments, a signal from the first module can be adapted to cause an initiation of the diagnostic cycle. In certain exemplary embodiments, if initiation of the diagnostic cycle does not occur within a predetermined time, the first module can be adapted to receive a notification that the second module has assumed mastership with respect to the first module.

At activity 5400, the second module can detect and/or attempt to detect a broken wire associated with a sensor.

At activity 5500, the second module can be adapted to receive a synchronization signal. The first module can be adapted to output the synchronization signal, which can be a synchronization pulse, to the second module. The synchronization signal adapted to cause an initiation of a data conversion cycle at the second module. The synchronization signal can be sent subsequent to an acknowledged request to establish communication with the second module.

At activity 5600, the diagnostic cycle can be terminated. In certain exemplary embodiments, the synchronization signal, which can be sent by the first module, can automatically cause a diagnostic cycle of the second module to terminate. The first module can be adapted to, upon completion of the diagnostic cycle, receiving an acknowledgment from the second module that the diagnostic cycle is complete.

At activity 5700, a data conversion cycle can begin. In certain exemplary embodiments, the data conversion cycle can begin automatically responsive to the synchronization signal. In certain exemplary embodiments, if initiation of the data conversion cycle does not occur within a predetermined time, the first module can be adapted to receive a notification that the second module has assumed mastership with respect to the first module. The data conversion cycle can be adapted to automatically obtain a temperature value from a thermocouple.

At activity 5800, data can be outputted. The data can be temperature data obtained from a thermocouple.

At activity 5900, the data conversion cycle can be terminated. In certain exemplary embodiments, the data conversion cycle can be automatically terminated. The first module can be adapted to, upon completion of the data conversion cycle, receive an acknowledgment that the data conversion cycle is complete.

Figure 6:
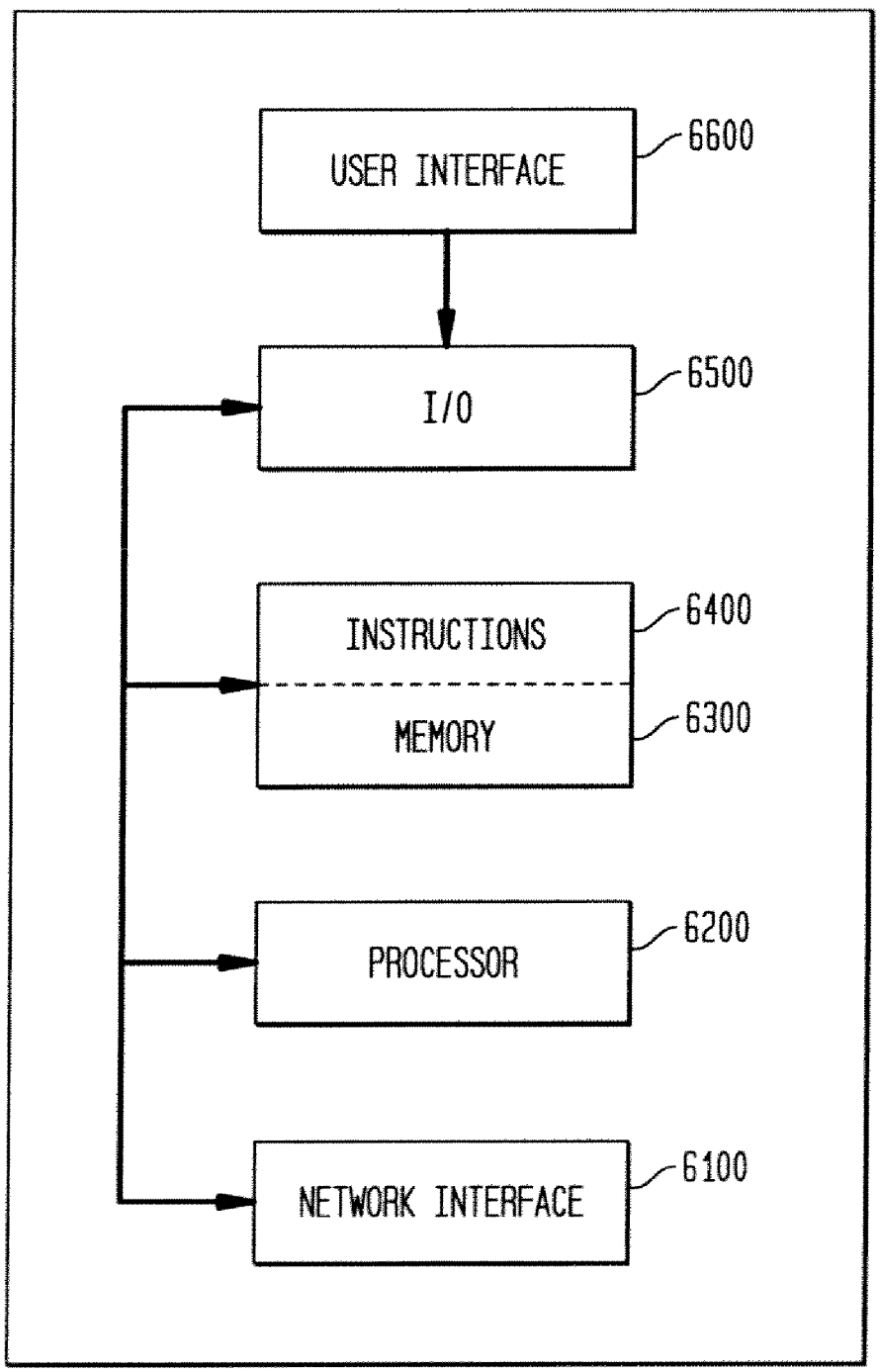
FIG. 6 is a block diagram of an exemplary embodiment of an information device 6000.

FIG. 6 is a block diagram of an exemplary embodiment of an information device 6000, which in certain operative embodiments can comprise, for example, user information device 1500 of FIG. 1. Information device 6000 can comprise any of numerous circuits and/or components, such as for example, one or more network interfaces 6100, one or more processors 6200, one or more memories 6300 containing instructions 6400, one or more input/output (I/O) devices 6500, and/or one or more user interfaces 6600 coupled to I/O device 6500, etc.

In certain exemplary embodiments, via one or more user interfaces 6600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.
acknowledge—to transmit a message from a receiver of data to acknowledge that a signal, information, or packet has been received from a sender.
acknowledgement—a response to a communication.
activity—an action, act, deed, function, step, and/or process and/or a portion thereof.
adapted to—suitable, fit, and/or capable of performing a specified function.
analog—a signal formed from continuous measurement and/or input.
apparatus—an appliance and/or device for a particular purpose.
associate—to relate, bring together in a relationship, map, combine, join, and/or connect.
assume—to take on a responsibility and/or role.
automatically—acting and/or operating in a manner essentially independent of external human influence and/or control. For example, an automatic light switch can turn on upon "seeing" a person in its view, without the person manually operating the light switch.
between—in a separating interval and/or intermediate to.
broken wire—an electrical conductor that fails to conduct or conducts very poorly.
can—is capable of, in at least some embodiments.
cause—to bring about, provoke, precipitate, produce, elicit, be the reason for, result in, and/or effect.
circuit—an electrically conductive pathway and/or a communications connection established across two or more switching devices comprised by a network and between corresponding end systems connected to, but not comprised by the network.
communication—a transmission and/or exchange of information.
completion—an act and/or state of reaching a conclusion.
comprising—including but not limited to, what follows.
configure—to design, arrange, set up, shape, and/or make suitable and/or fit for a specific purpose.
conversion—a transformation.
convert—to transform, adapt, and/or change, such as from a first form to a second form.

coupleable—capable of being joined, connected, and/or linked together.

create—to make, form, produce, generate, bring into being, and/or cause to exist.

data—information represented in a form suitable for processing by an information device.

define—to establish the meaning, relationship, outline, form, and/or structure of; and/or to precisely and/or distinctly describe and/or specify.

detect—to sense, perceive, identify, discover, ascertain, respond to, and/or receive the existence, presence, and/or fact of.

determine—to obtain, calculate, decide, deduce, establish, and/or ascertain.

device—an instrumentality adapted to a particular purpose.

diagnostic cycle—a set of activities adapted to determine a failure of a device and/or system.

does not—fails to perform an activity.

establish—to create, form, and/or set-up.

first—an initial element in a set.

from—used to indicate a source.

further—in addition.

generate—to create, produce, render, give rise to, and/or bring into existence.

haptic—both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

hard deadline—the special case where completing an activity within the deadline results in the system receiving all the utility possible from that activity, and completing the activity outside of the deadline results in zero utility (i.e., resources consumed by the activity were wasted, such as when one travels to the beach to photograph a sunrise on a particular day and arrives after the sun has already arisen) or some negative value of utility (i.e., the activity was counter-productive, such as when firefighters enter a burning building to search for a missing person seconds before the building collapses, resulting in injury or death to the firefighters). The scheduling criterion for a hard deadline is to always meet the hard deadline, even if it means changing the activity to do so.

hard real-time—relating to computer systems that provide an absolute deterministic response to an event. Such a response is not based on average event time. Instead, in such computer systems, the deadlines are fixed and the system must guarantee a response within a fixed and well-defined time. Systems operating in hard real-time typically interact at a low level with physical hardware via embedded systems, and can suffer a critical failure if time constraints are violated. A classic example of a hard real-time computing system is the anti-lock brakes on a car. The hard real-time constraint, or deadline, in this system is the time in which the brakes must be released to prevent the wheel from locking. Another example is a car engine control system, in which a delayed control signal might cause engine failure or damage. Other examples of hard real-time embedded systems include medical systems such as heart pacemakers and industrial process controllers.

information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

initialize—to create, produce, render, give rise to, and/or bring into existence.

initiate—to begin.

initiation—a preparation for subsequent activities.

input—a signal, data, and/or information provided to a processor, device, and/or system.

input module—a device and/or system adapted to receive information between a programmable logic controller (PLC) and a predetermined set of sensors and/or actuators.

machine-implementable instructions—directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can obtain and/or store data, information, and/or instructions. Examples include memories, punch cards, programmable logic controller (PLC)—a solid-state, microprocessor-based, hard real-time computing system that is used, via a network, to automatically monitor the status of field-connected sensor inputs, and automatically control communicatively-coupled devices of a controlled industrial system (e.g., actuators, solenoids, relays, switches, motor starters, speed drives (e.g., variable frequency drives, silicon-controlled rectifiers, etc.), pilot lights, igniters, tape drives, speakers, printers, monitors, displays, etc.) according to a user-created set of values and user-created logic and/or instructions stored in memory. The sensor inputs reflect measurements and/or status information related to the controlled industrial system. A PLC provides any of: automated input/output control; switching; counting; arithmetic operations; complex data manipulation; logic; timing; sequencing; communication; data file manipulation; report generation; control; relay control; motion control; process control; distributed control; and/or monitoring of processes, manufacturing equipment, and/or other automation of the controlled industrial system. Because of its precise and hard real-time timing and sequencing capabilities, a PLC is programmed using ladder logic or some form of structured programming language specified in EC 61131-3, namely, FBD (Function Block Diagram), LD (Ladder Diagram), ST (Structured Text, Pascal type language), IL (Instruction List) and/or SFC (Sequential Function Chart). Because of its precise and real-time timing and sequencing capabilities, a PLC can replace up to thousands of relays and cam timers. PLC hardware often has good redundancy and fail-over capabilities. A PLC can use a Human-Machine Interface (HMI) for interacting with users for configuration, alarm reporting, and/or control and/or optically-readable forms, etc.

master—a machine or component adaptable to control another machine or component.

mastership—a state of being a master.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

network—a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device.

obtain—to receive, get, take possession of, procure, acquire, calculate, determine, and/or compute.

occur—to take place.

output—(n) something produced and/or generated; data produced by an information device executing machine-readable instructions; and/or the energy, power, work, signal, and/or information produced by a system. (v) to provide, produce, manufacture, and/or generate.

plurality—the state of being plural and/or more than one.

predetermined—determined, decided, or established in advance.

processor—a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

provide—to furnish, supply, give, convey, send, and/or make available.

pulse—a transient variation of a quantity (such as electric current or voltage) whose value is otherwise constant. Sometimes repeated with a regular period and/or according to some code.

real-time—a system (or sub-system) characterized by time constraints on individual activities and scheduling criteria for using those time constraints to achieve acceptable system timeliness with acceptable predictability.

receive—to gather, take, acquire, obtain, accept, get, and/or have bestowed upon.

relationship—an association between two or more object and/or entities.

render—to display, annunciate, speak, print, and/or otherwise make perceptible to a human, for example as data, commands, text, graphics, audio, video, animation, and/or hyperlinks, etc., such as via any visual, audio, and/or haptic mechanism, such as via a display, monitor, printer, electric paper, ocular implant, cochlear implant, speaker, etc.

request—(v.) to express a need and/or desire for; to inquire and/or ask for. (n.) that which communicates an expression of desire and/or that which is asked for.

role—function.

said—when used in a system or device claim, an article indicating a subsequent claim term that has been previously introduced.

second—an element following a first element in a set.

select—to make and/or indicate a choice and/or selection from among alternatives.

send—to convey, dispatch, and/or transmit.

set—a related plurality of predetermined elements; and/or one or more distinct items and/or entities having a specific common property or properties.

signal—information encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal can be synchronous, asynchronous, hard real-time, soft real-time, non-real time, continuously generated, continuously varying, analog, discretely generated, discretely varying, quantized, digital, continuously measured, and/or discretely measured, etc.

slave—an input device or a controllable device.

soft deadline—the general case where completing an activity by a deadline results in a system receiving a utility measured in terms of lateness (completion time minus deadline), such that there exist positive lateness values corresponding to positive utility values for the system. Lateness can be viewed in terms of tardiness (positive lateness), or earliness (negative lateness). Generally, and potentially within certain bounds, larger positive values of lateness or tardiness represent lower utility, and larger positive values of earliness represent greater utility.

soft real-time—relating to computer systems that take a best efforts approach and minimize latency from event to response as much as possible while keeping throughput up with external events overall. Such systems will not suffer a critical failure if time constraints are violated. For example, live audio-video systems are usually soft real-time; violation of time constraints can result in degraded quality, but the system can continue to operate. Another example is a network server, which is a system for which fast response is desired but for which there is no deadline. If the network server is highly loaded, its response time may slow with no failure in service. This is contrasted with an anti-lock braking system where a slow down in response would likely cause system failure, possibly even catastrophic failure.

store—to place, hold, retain, enter, and/or copy into and/or onto a machine-readable medium.

subsequent—following in time.

substantially—to a considerable, large, and/or great, but not necessarily whole and/or entire, extent and/or degree.

synchronization—occurring in accordance with timekeeping adapted to coordinate events of a system to maintain an orderly sequential flow in hard real time.

system—a collection of mechanisms, devices, machines, articles of manufacture, processes, data, and/or instructions, the collection designed to perform one or more specific functions.

temperature—measure of the average kinetic energy of the molecules in a sample of matter, expressed in terms of units or degrees designated on a standard scale.

terminate—to end.

thermocouple—a transducer consisting of two different metals welded together at each end; a voltage is produced that is proportional to a difference in temperature between the two junctions.

time—a measurement of a point in a nonspatial continuum in which events occur in apparently irreversible succession from the past through the present to the future.

transmit—to provide, furnish, supply, send as a signal, and/or to convey (e.g., force, energy, and/or information) from one place and/or thing to another.

upon—at which time.

user—a person, organization, process, device, program, protocol, and/or system that uses a device, system, process, and/or service.

user interface—a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

value—a measured, assigned, determined, and/or calculated quantity or quality for a variable and/or parameter.

via—by way of and/or utilizing.

wherein—in regard to which; and; and/or in addition to.

with respect—in relation to.

within—inside.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A system comprising:
   a first analog input module adapted to:
     request and then assume mastership with respect to a second analog input module;
     output a synchronization pulse to said second analog input module to synchronize a diagnostic cycle and a data conversion cycle;
     initiate a performance of a diagnostic cycle of said second analog input module; and
     initiate a data conversion cycle; and
   said second analog input module adapted to assume a slave role with respect to said first analog input module;
     wherein the diagnostic cycle is disabled during the data conversion cycle.

2. The system of claim 1, wherein said first analog input module is further adapted to:
   define a master/slave relationship with respect to said second analog input module.

3. The system of claim 1, wherein said system is adapted to:
   define a master/slave relationship between said first analog input module and said second analog input module.

4. The system of claim 1, wherein said first analog input module is further adapted to:
   send to said second analog input module a request to establish communication with said second analog input module.

5. The system of claim 1, wherein said first analog input module is further adapted to:
   receive from said second analog input module an acknowledgment of a request to establish communication between said first analog input module and said second analog input module.

6. The system of claim 1, wherein said first analog input module is further adapted to:
   establish communication with said second analog input module.

7. The system of claim 1, wherein said second analog input module is further adapted to:
   upon completion of said diagnostic cycle, send acknowledgment that said diagnostic cycle is complete.

8. The system of claim 1, wherein said second analog input module is further adapted to:
   upon completion of said data conversion cycle, send acknowledgment that that data conversion cycle is complete.

9. The system of claim 1, wherein said second analog input module is further adapted to:
   if initiation of said diagnostic cycle does not occur within a predetermined time, assume mastership with respect to said first analog input module.

10. The system of claim 1, wherein said second analog input module is further adapted to:
    if initiation of said data conversion cycle does not occur within a predetermined time, assume mastership with respect to said first analog input module.

11. The system of claim 1, wherein:
said diagnostic cycle is adapted to automatically detect a broken wire.

12. The system of claim 1, wherein:
said data conversion cycle is adapted to automatically obtain a temperature value from a thermocouple.

13. A system comprising:
a first analog input module adapted to, via a sent synchronization signal to synchronize a diagnostic cycle and a data conversion cycle, automatically terminate a diagnostic cycle being performed by a second analog input module, said synchronization signal further adapted to cause an initiation of a data conversion cycle at said second analog input module after the termination of the diagnostic cycle, said synchronization signal sent subsequent to an acknowledged request to establish communication with said second analog input module.

14. A method comprising:
via a sent synchronization signal to synchronize a diagnostic cycle and a data conversion cycle, the synchronization signal sent by a first analog input module of a programmable logic controller, automatically causing a diagnostic cycle being performed by a second analog input module to terminate, said synchronization signal further adapted to cause an initiation of a data conversion cycle at said second analog input module after the termination of the diagnostic cycle, said synchronization signal sent subsequent to an acknowledged request to establish communication with said second analog input module.

15. A method comprising:
at a first analog input module:
   requesting and then assuming mastership with respect to a second analog input module, said second analog input module adapted to assume a slave role with respect to said first analog input module;
   outputting a synchronization pulse to said second analog input module to synchronize a diagnostic cycle and a data conversion cycle;
   initiating a performance of a diagnostic cycle of said second analog input module; and
   initiating a data conversion cycle after the diagnostic cycle has completed or been disabled via the synchronization pulse.

* * * * *